(12) United States Patent
Smith

(10) Patent No.: US 7,680,703 B1
(45) Date of Patent: Mar. 16, 2010

(54) DATA MINING SYSTEM CAPABLE OF GENERATING PAIRWISE COMPARISONS OF USER-SELECTABLE ITEMS BASED ON USER EVENT HISTORIES

(75) Inventor: Brent R. Smith, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 28 days.

(21) Appl. No.: 12/134,063

(22) Filed: Jun. 5, 2008

(51) Int. Cl.
G06Q 30/00 (2006.01)
(52) U.S. Cl. ............................................. 705/26
(58) Field of Classification Search .................. 705/26, 705/27
See application file for complete search history.

(56) References Cited

U.S. PATENT DOCUMENTS

| | | | |
|---|---|---|---|
| 5,909,023 | A | 6/1999 | Ono et al. |
| 6,438,579 | B1 | 8/2002 | Hosken |
| 6,460,036 | B1 | 10/2002 | Herz |
| 6,691,163 | B1 | 2/2004 | Tufts |
| 6,782,370 | B1 | 8/2004 | Stack |
| 6,839,680 | B1 | 1/2005 | Liu et al. |
| 7,092,936 | B1 | 8/2006 | Alonso et al. |
| 2002/0019763 | A1 | 2/2002 | Linden et al. |
| 2002/0052873 | A1* | 5/2002 | Delgado et al. ............. 707/7 |
| 2002/0198882 | A1 | 12/2002 | Linden et al. |
| 2004/0117402 | A1* | 6/2004 | Tateson et al. ........... 707/104.1 |
| 2007/0192317 | A1 | 8/2007 | Finley et al. |
| 2008/0040341 | A1* | 2/2008 | York et al. ..................... 707/5 |

OTHER PUBLICATIONS

R. Agrawal et al., "Quest: a project on database mining," Proceedings of the 1994 ACM SIGMOND International Conference on Management of Data, 1994, p. 514 (ISSN: 0163-5808).
R. Agrawal et al., "Mining association rules between sets of items in large databases," Proceedings of the 1993 ACM SIGMOD International Conference on Management of Data, 1993, pp. 207-216.
M. Gery and H. Haddad, "Evaluation of web usage mining approaches for user's next request prediction," Proceedings of the 5th ACM International Conference on Web information and Data Management, pp. 74-81, 2003 (ISBN: 1-58113-725-7).

(Continued)

Primary Examiner—Mila Airapetian
(74) Attorney, Agent, or Firm—Knobbe, Martens, Olson & Bear LLP

(57) ABSTRACT

Data mining systems and methods are disclosed for generating data that is helpful to users in selecting between items represented in an electronic data repository, such as an electronic catalog. One disclosed data mining method generates pairwise comparison data for particular pairs of items. The pairwise comparison data for a given item pair reveals the degree to which users who consider both items in the pair select one item over the other. The pairwise comparison data may be appropriately exposed to users of the electronic repository. For instance, in the context of an electronic catalog, an item detail page for item A may be supplemented with an indication that users who view both item A and item B select item B a specified percentage of the time. Another data mining method uses item viewing histories and item purchase histories of users in combination to identify pairs of items that are good candidates for being recommended in combination.

25 Claims, 9 Drawing Sheets

OTHER PUBLICATIONS

R. Srikant and R. Agrawal, "Mining Sequential Patterns: Generalizations and Performance Improvements," Proceedings of the 5th International Conference on Extending Database Technology, pp. 3-17, 1996 (ISBN: 3-540-61057-X).

Zaiane, et al., "Discovery Web Access Patterns and Trends by Applying OLAP and Data Mining Technology on Web logs," Proceedings of IEEE International Forum on Research and Technology Advances in Digital Libraries, pp. 19-29, Apr. 22-24, 1988.

Co-owned, co-pending U.S. Appl. No. 10/864,288, filed Jun. 9, 2004 (filing receipt, specification and drawings enclosed).

Co-owned, co-pending U.S. Appl. No. 11/694,745, filed Mar. 30, 2007 (filing receipt, specification and drawings enclosed).

* cited by examiner

FIG. 2

Sony Bravia KDL-40V3000 40-inch 1080p LCD HDTV
Other products by Sony

★★★★☆ ☑ (91 customer reviews) | More about this product

List Price: $1,899.99
Price: $1,400.24 Free Shipping
You Save: $499.75 (26%)
Availability: In Stock.

What Do Customers Ultimately Buy After Comparing With This Item?

93% prefer
Samsung LNT4065F 40-inch 1080p LCD HDTV ★★★★☆ (164)
Click to see price 89% prefer
Sony Bravia KDL-40S3000 40-inch 720p LCD HDTV ★★★★☆ (164)
Click to see price 87% prefer
Samsung LNT4061F 40-inch 1080p LCD HDTV ★★★★☆ (164)
Click to see price 75% prefer
Sony KDL-40V2500 40" Bravia V-Series 1080p LCD HDTV ★★★★☆ (164)
Click to see price

[Compare these items]   Explore similar items

60

Polar FG Men's and Women's HRM Watch

GRAPHIC IMAGE OF PRODUCT

List Price: $131.88
Price: $98.00
You Save: $33.88 (26%)
Availability: Usually ships within 24 hrs.

---

Customers who viewed this item also viewed:

| | | |
|---|---|---|
| Omiron HR-100 HRM | GRAPHIC IMAGE | |
| Polar F11 HRM | GRAPHIC IMAGE | Bought 58% of the time when compared with the featured item — 80 |
| Polar F4 HRM | GRAPHIC IMAGE | |
| Polar RS100 HRM | GRAPHIC IMAGE | Bought 75% of the time when compared with the featured item — 81 |
| Reebok HRM 10S | GRAPHIC IMAGE | |

---

Product Details

Shipping Weight: 12 ounces
Shipping: US only
Average Customer Review: ★★★★  (123 Customer Reviews)

DATA MINING SYSTEM CAPABLE OF GENERATING PAIRWISE COMPARISONS OF USER-SELECTABLE ITEMS BASED ON USER EVENT HISTORIES

BACKGROUND

A variety of data mining methods exist for automatically detecting behavioral relationships between items stored or represented in a data repository. For example, in the context of an electronic catalog of items, data mining processes are commonly used to identify items that tend to be viewed, purchased, downloaded, or otherwise selected in combination. Different types of item relationships may be detected based on different types of user activity. For instance, a pair of items, A and B, may be identified as likely substitutes if a relatively large number of those who view A also view B during the same browsing session. Items C and D, on the other hand, may be identified as likely being complementary of each other if a relatively large number of those who purchase C also purchase D.

The item relationships detected using such processes may be exposed to users to assist users in identifying and selecting items of interest. For example, in some electronic catalog systems, when a user views an item, the user is informed of other items that are commonly viewed or bought by those who have viewed or purchased this item. Although this type of data assists the user in identifying a set of candidate items from which to select (e.g., a set of consumer electronics products with similar features), it generally does not help the user discriminate between these candidate items. Thus, the user typically must rely solely on the descriptions of the candidate items, including any user ratings and reviews, in making a purchase decision.

The need for users to more effectively identify and select between alternative items also arises in a variety of other contexts. For example, in a social networking system, a user may wish to identify a set of users that satisfy particular criteria, and to then select a particular user with which to establish a connection or a communication session. As another example, a user may wish to identify RSS (Really Simple Syndication) or news feeds related to a particular topic, and to then select a particular feed to which to subscribe.

A need also exists in the data mining field to more effectively identify items that are useful in combination. Currently, some e-commerce web sites use purchase-based item relationships ("customers who bought A also bought B") to automatically select pairs of items to suggest purchasing in combination. In some cases, however, this process results in poor bundling suggestions.

BRIEF DESCRIPTION OF THE DRAWINGS

FIG. 2 illustrates one example of how pairwise comparison data generated by the system of FIG. 1 can be incorporated into an item detail page of an electronic catalog.

FIG. 4 illustrates another example of how the pairwise comparison data can be presented on an item detail page.

FIG. 7 depicts an illustrative user interface for displaying item bundling suggestions generated by the system of FIG. 1.

DETAILED DESCRIPTION OF SPECIFIC EMBODIMENTS

Figure 1:
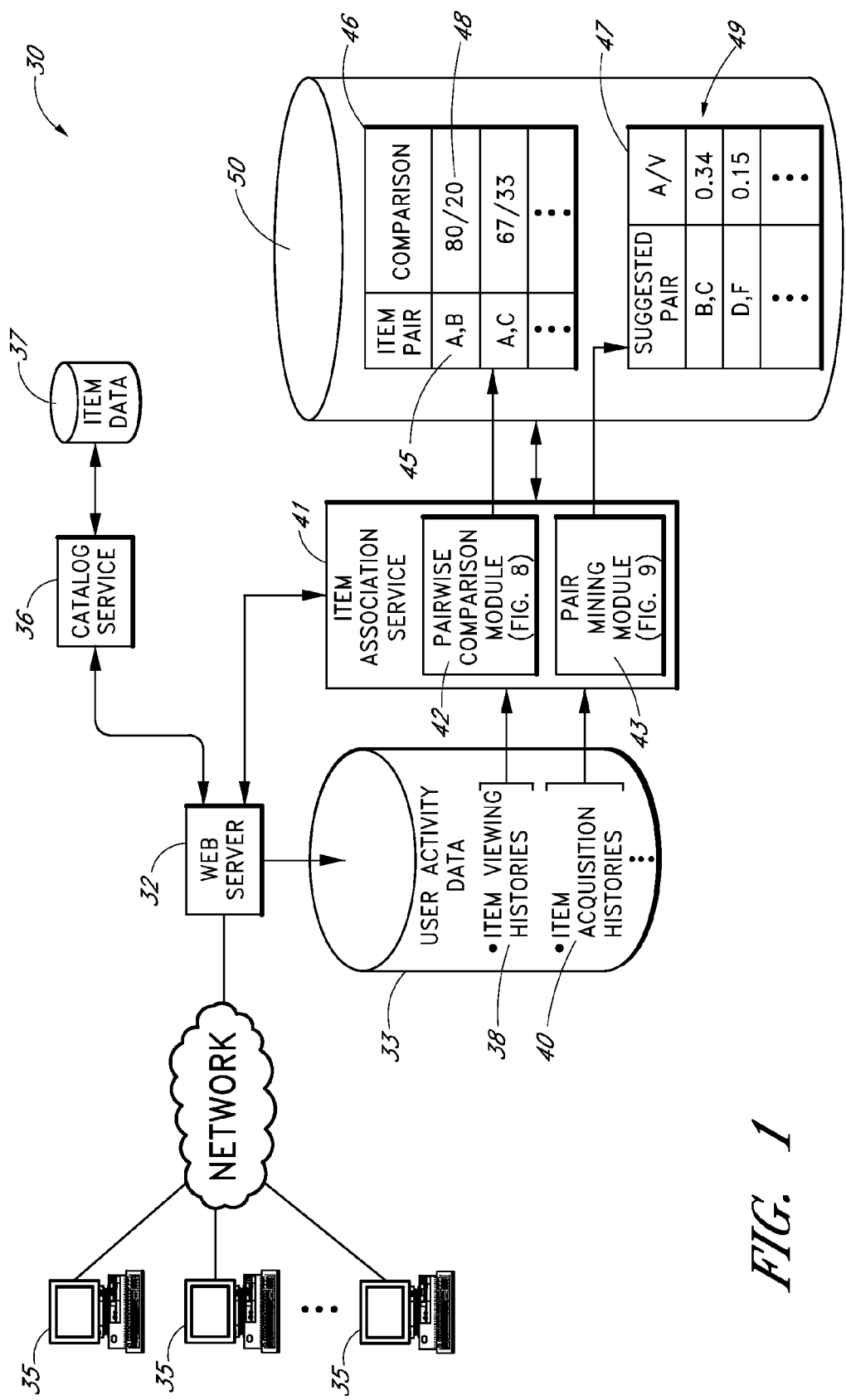
FIG. 1 depicts one embodiment of a system capable of collecting user activity data, and of mining the collected data to generate pairwise comparison data and item bundling suggestions.

Specific embodiments will now be described with reference to the drawings. These embodiments are intended to illustrate, and not limit, the inventions set forth in the claims. Nothing in this detailed description is intended to imply that any particular feature, characteristic, or component of the disclosed systems and methods is essential.

I. Overview

Data mining systems and methods are disclosed for generating item relationship data, including item comparison data, that may be helpful to users in making item selection decisions. The relationship data may be mined from user activity data (also referred to as "event history data") reflective of item-specific actions performed by users via their computing devices. The items may, for example, be products represented in an electronic catalog, users represented on a social networking site, RSS or other feeds to which users can subscribe, travel destinations represented on a travel agency site, or service providers from which services can be requested. Other examples of item types are described below. The relationship data mined via the disclosed methods may be exposed to users in various ways to assist users in making item selection decisions.

One disclosed data mining method involves generating "pairwise comparison" data for particular pairs of items. In one embodiment, the pairwise comparison data indicates, or strongly reflects, the tendency of users who consider both items to ultimately select one item over the other. For example, for a given pair of items, A and B, a set of users may initially be identified who both (1) considered both A and B, and (2) selected either A or B in connection with the consideration of the two items. This may be accomplished by, for example, identifying all browsing sessions in which both A and B were considered and only A or B was selected. Once these users or user sessions have been identified, the associated data may be analyzed in aggregate to generate statistical data regarding how frequently one item is selected over the other. For example, a determination may be made that, of the users who considered both A and B and selected one over the other, 60% chose A and 40% chose B. (See FIG. 8, discussed below, for one example of how pairwise comparison data may be generated using sessions.)

Such pairwise comparison data may be generated periodically for many different item pairs. This data may be exposed to users in various ways to assist users in selecting particular items. For example, when a user views or otherwise considers item A on a web site or other interactive system, the user may be presented with a display indicating, e.g., that users choose:

B1 over A 90% of the time;
B2 over A 75% of the time;
B3 over A 42% of the time; and
B4 over A 12% of the time.

As discussed below, the pairwise comparison information may alternatively be presented in a different format (e.g., "20 out of 25 customers chose A over B"). In some embodiments, pairwise comparison data may be presented only for pairs of items in which the two items are determined to be likely substitutes for each other. Two items may be treated as likely substitutes if, for example, the following two conditions are met: (1) both are considered during the same browsing session relatively frequently, and (2) those who consider both items very rarely, if ever, ultimately select both.

The types of user actions that are treated as "item consideration" and "item selection" can vary widely depending upon the types of items involved, and the types of item-related actions that can be performed, in a given environment. For example, in the context of an electronic catalog of items that can be viewed and purchased, the viewing of an item's detail page may be treated as "consideration" of the item, and the purchase of an item can be treated as "selection." (An "item detail page" is generally a page that features, and displays detailed information about, a single item, although the page may also list other items that are related to the featured item.) In this example, the item detail page for item A and/or item B can be supplemented with messaging indicating, e.g., that "X % of those who made a choice between A and B chose A." (See FIGS. 2 and 4-6, discussed below, for examples of how this type of data can be incorporated into item detail pages.) As another example, in the context of a video/DVD rental site, the viewing of a video title's detail page may be treated as consideration of the item, and the addition of the video title to a rental queue may be treated as selection of the item. As yet another example, in the context of a download rental service, the viewing of a movie's trailer (e.g., via a television set-top box or via a web browser) may be treated as consideration of the movie, and the renting or downloading of the movie may be treated as selection.

Table 1 below provides some examples of the types of item-specific user actions that may be treated as "consideration" and "selection" in various environments. These and other types of user actions can be identified from user event histories or clickstreams commonly maintained by various types of interactive systems, including but not limited to server systems that host web sites. Each "consideration" action listed for a given environment can be used with any of the "selection" actions listed for that environment, and all such combinations are contemplated. Numerous other examples will be apparent to those skilled in the art.

TABLE 1

| Environment | Item "consideration" action | Item "selection" action |
| --- | --- | --- |
| E-commerce site that hosts an electronic catalog of items that are available for purchase and/or rental. | Viewing an item's detail page<br>Viewing a description of the item elsewhere in the catalog<br>Viewing a media trailer or audio sample | Renting or purchasing the item<br>Adding the item to a shopping cart<br>Adding the item to a wish list<br>Adding the item to a rental queue<br>Downloading the item<br>Bidding on the item |
| Feed aggregation site or system that enables users to view information about, and subscribe to, particular feeds. | Viewing feed's description<br>Viewing the feed itself | Subscribing to the feed |
| Social networking system in which the "items" are registered users who have public profile pages, and in which users can send connection requests, and/or initiate communication sessions, with other users | Viewing a user's profile page | Sending a connection request to a user<br>Initiating a communication session with a user |
| Social networking/community site in which users can read about and explicitly join particular user communities | Viewing a description about a particular user community | Joining the community |
| News site in which the items are news articles that can be selected for viewing | Viewing a new article | Viewing the article for an extended time period<br>Adding the article to a personal library<br>Forwarding the article to another user<br>Submitting a comment on the article |
| Travel site in which users can read about vacation spots and make associated travel reservations | Viewing of a travel destination's description | Purchasing an airline ticket to the viewed destination<br>Reserving a car or hotel in viewed destination |
| Internet search engine site in which the items are documents, such as web pages, that are responsive to user's search query. | Viewing of a search results page in which the item is included in the search results (note that the items can include sponsored links) | Clicking through from the search results page to the particular item. |

Appropriate processing steps can be performed to increase the likelihood that the pairwise comparison data is based primarily or exclusively on event sequences in which the users made intentional choices between the two items at issue. For example, a clickstream in which a user considered A and B and ultimately selected A or B may be disregarded, or accorded lesser weight, if one or more of the following conditions is met: (1) the user did not consider both A and B within a selected time interval, such as one hour or one day, (2) the user considered a large number (e.g., ten or more) intervening items between considering A and B; (3) the user made an intervening purchase, or performed another type of ultimate selection action, after considering one item and before considering the other, (4) the user's ultimate selection of A or B occurred more than a threshold amount of time, such as one day or one week, after the two items were considered.

Figure 7:
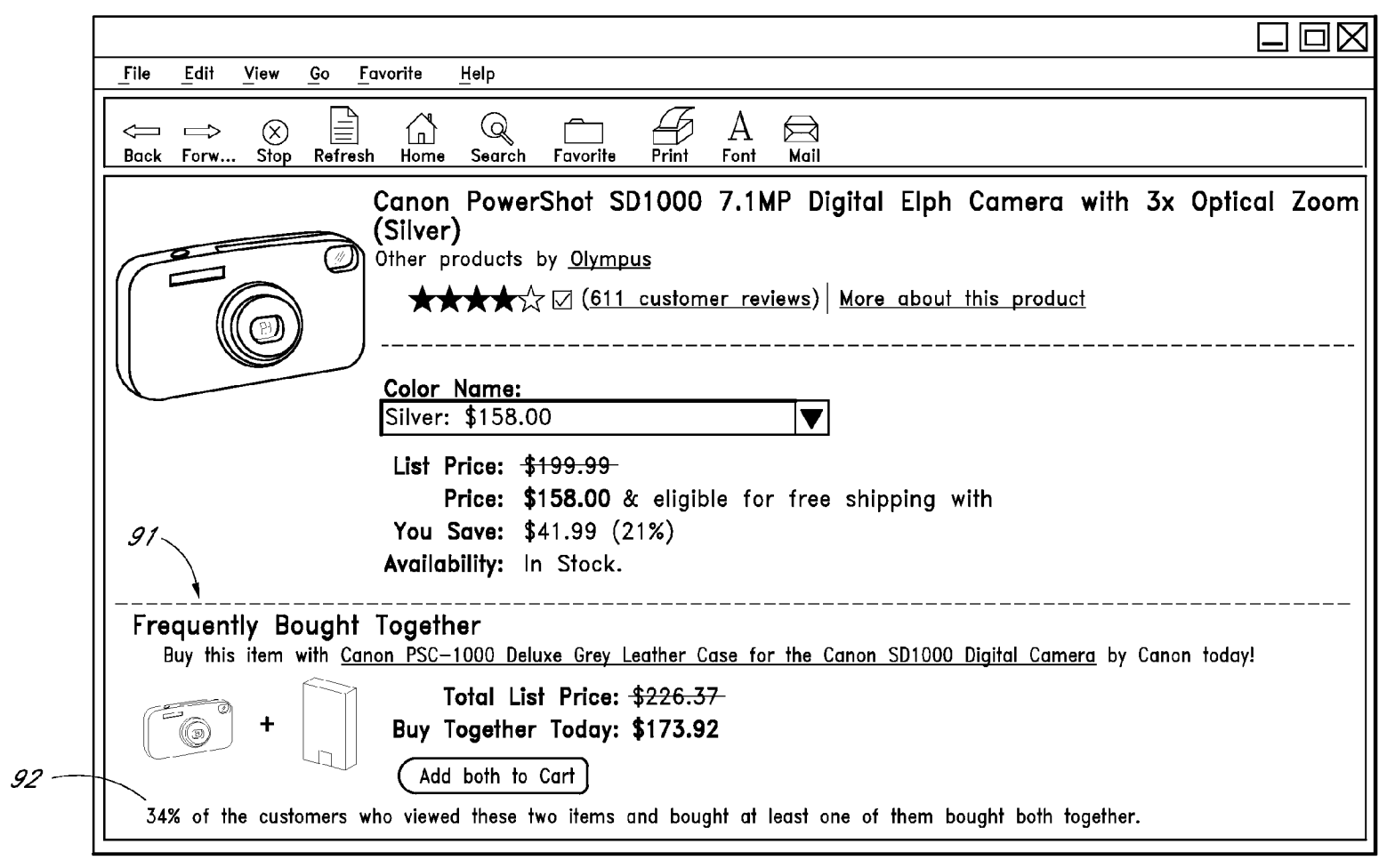
Figure 9:
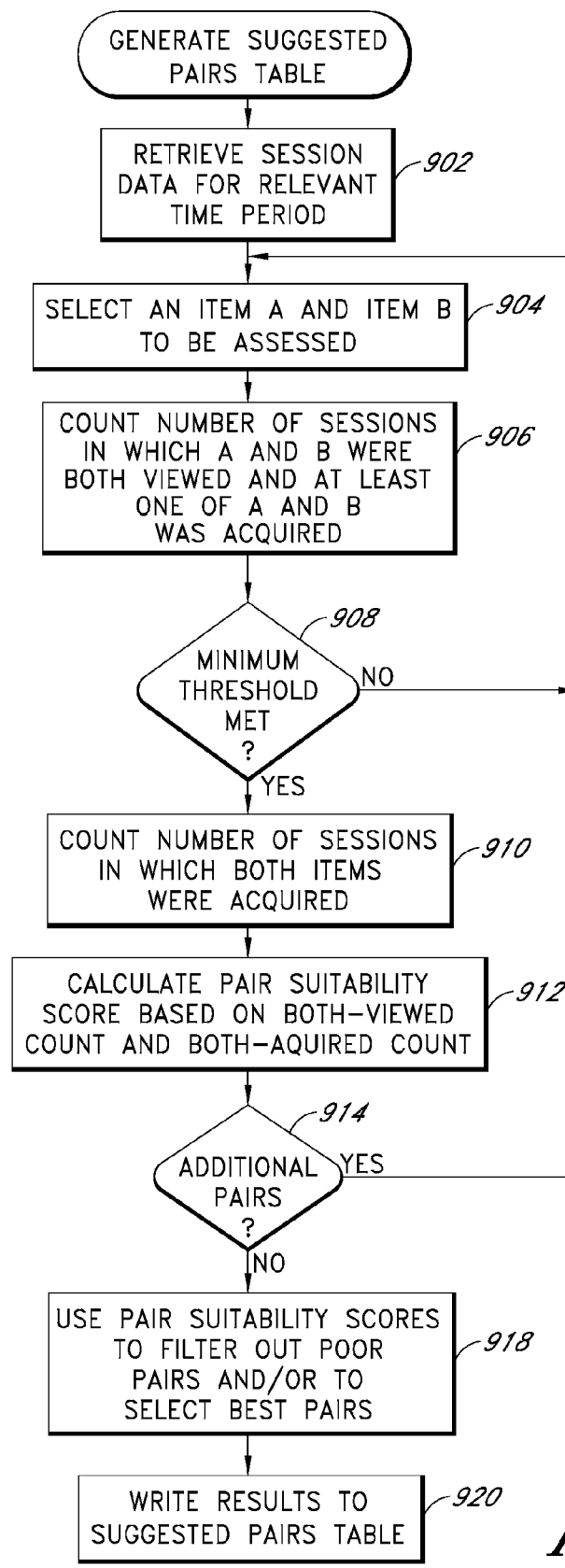
FIG. 9 depicts an illustrative data mining method for using collected user activity data to identify pairs of items to suggest in combination.

Also disclosed is a data mining method for more effectively identifying pairs of items that are well suited for being purchased or otherwise acquired in combination. FIG. 9, discussed below, illustrates one example of this method. In one embodiment, rather than merely relying on user purchase history data to identify item pairs to suggest, the method uses item viewing histories and item purchase histories in combination. For example, the method may detect that a relatively large number of users who viewed both A and B purchased both items together. This statistical information may be exposed to users, and/or may be used to cause the two items to be suggested as a bundle. FIG. 7, discussed below, illustrates one example of how a resulting item pair may be presented together with statistical information.

II. Example System (FIG. 1)

FIG. 1 illustrates one example of a system 30 in which the disclosed data mining methods can be employed, and illustrates components for implementing the data mining methods. In this particular embodiment, the items are catalog items represented in a browsable electronic catalog hosted by an Internet-accessible web site system. As will be apparent, the disclosed data mining methods are not limited to such an environment.

The system 30 includes a web server 32 that generates and serves web pages to computing devices 35 of end users. The computing devices 35 may, for example, include personal computers, personal digital assistants, mobile phones, set-top boxes for televisions, and other types of devices that run web browser software. The web server 32 may be implemented as any number of physical servers/machines that run web server software.

The web server 32 provides user access to an electronic catalog of items that are available via the system 30 for purchase, rental, or another form of "acquisition." The items may, for example, include consumer electronics products; household appliances; book, music and video titles in physical and/or downloadable form; magazine and other subscriptions; software programs; grocery items, and various other types of items that may be found in an electronic catalog. In a typical embodiment, many thousands or millions of unique items are represented in the catalog.

Detailed information about each item may be obtained by users by accessing the item's detail page within the catalog. To access an item's detail page in one embodiment, a user generally must either click on a description of the item (e.g., on a category page, search results page, or recommendations page), or submit a search query that uniquely identifies the item. Thus, a user's access to an item's detail page generally represents an affirmative request for information about the item. Each item detail page may provide an option for the user to purchase the item; add the item to a shopping cart, wish list, or rental queue; bid on the item; pre-order the item, and/or perform another type of acquisition-related action.

As depicted in FIG. 1, as users access the web site, various types of user actions are recorded in a repository of user activity data 33 (also referred to as "event data"). For example, each item detail page access event and each item acquisition event (e.g., purchase, rental or license) may be recorded. The events may be captured together with event metadata, such as user identifiers, time/date stamps, session identifiers, etc., that may be used for data mining. The event data may be maintained in any appropriate format or formats (e.g., log files, databases, etc.). In addition, different types of event data may be stored separately from others (e.g., in different databases, records, files, etc.).

The web server 32 generates requested catalog pages dynamically in response to requests from the user devices 35. The item data included in the catalog pages (item description, price, availability, etc.) is retrieved from a catalog service 36, which accesses a repository 37 of item data. The content included in the catalog pages also includes various types of item association data retrieved from an item association service 41. For example, as is known in the art, the web server 32 may supplement item detail pages with lists of related items. These lists may be based on purchase-based associations (e.g., "customers who buy A also buy B and C"), view-based associations (e.g., "customers who view D also view E and F"), and other types of item relationships. The item association data also includes pairwise comparison data and suggested item pairs or bundles, as discussed above. FIGS. 3-7, discussed below, illustrate examples of how various types of item association data, including pairwise comparison data and suggested item pairs, may be incorporated into catalog pages.

Figure 8:
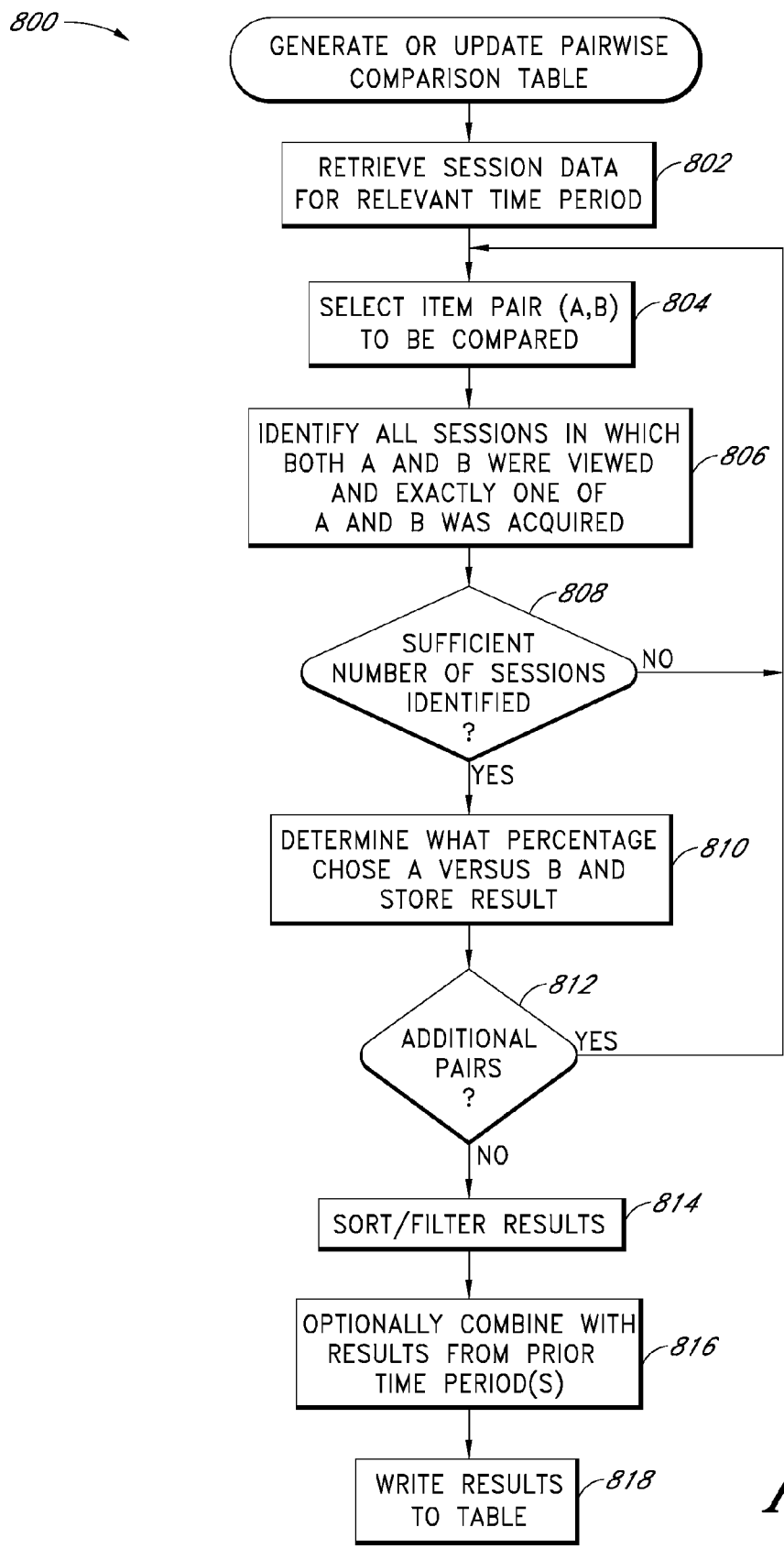
FIG. 8 depicts an illustrative data mining method for generating pairwise comparison data from collected user activity data.

As further illustrated in FIG. 1, the item association service 41 includes a pairwise comparison program module 42 that generates the pairwise comparison data, and includes a pair mining program module 43 that identifies suggested item pairs. Both modules 42 and 43 operate by analyzing collected event history data, and particularly user-specific item viewing histories 38 and item acquisition histories 40, as shown in FIGS. 8 and 9 and discussed below. In one embodiment, the item viewing histories are based on item detail page visits, and the item acquisition histories are based on purchases and/or other types of transactions that involve the payment of money to obtain access to an item. Although both a pairwise comparison module 42 and a pair mining module 43 are shown, these modules correspond to distinct web site features, and either one of these modules may be omitted in some embodiments.

The pairwise comparison module 42 generates or makes updates to an item pair comparison table 46 stored in a database or other data repository 50. This table 46 stores the pairwise comparison data for specific pairs of items. For example, the first entry (shown as a row) in this table 46 corresponds to the item pair (A, B) 45, and stores the pairwise comparison data 48 for this pair (depicted as percentage values totaling 100%). In this example, the comparison data reveals that approximately 80% of the users who have viewed both items, and have selected one over the other, have selected A over B. Although each entry depicted in FIG. 1 corresponds to a particular item pair, a table format can be used in which a single entry contains data for multiple pairwise comparisons. For example, the entry A→B1 (0.800), B2 (0.653), B3

(0.374), B4 (0.220) contains the pairwise comparison data for four different item pairs: (A, B1), (A, B2), (A, B3), and (A, B4).

The pairwise comparison data may be generated based on item viewing histories and item acquisition histories collected over a selected time period, such as one day, one week, one year, or since inception. The table entries may be updated periodically (e.g., hourly, daily, or as relevant events occur) to reflect newly collected event data. The pairwise comparison analysis may optionally be performed such that greater weight is given to data collected from the most recent time periods; for example, an exponential decay algorithm may be used in which the amount of weight given to collected event data decays with time. With this approach, the comparison data more strongly reflects the current preferences of users.

The pairwise comparison data values may be displayed in the catalog in association with specific items to assist users in making informed item selection decisions. For example, while viewing the item A, the user may be presented with messaging indicating that "65% of those who choose between items A and B choose item B." Thus, in addition to being informed of other items that are similar or related to the item selected for viewing, the user is provided with data that assists the user in selecting between the various related items. This data allows the user to very efficiently rely on the research conducted by prior users who considered the items being compared.

In some embodiments, entries are created in the pairwise comparison table only for item pairs for which one or more of the following criteria are met: (1) the percentage of users who purchased both items is small (e.g., less than 0.5% of those who purchased at least at least one of the two items after viewing both), (2) both items fall in the same bottom-level item category; (3) the two items co-occur relatively frequently in session-specific item viewing histories of users. These criteria increase the likelihood that the two items will be seen by users as substitutes for, or alternatives of, each other. Other criteria, such as similarity in price or physical attributes, may also be considered. The item association service 41 may also refrain from generating or outputting pairwise comparison data where the collected event data for a given item pair is insufficient to generate a statistically reliable comparison; for example, a requirement may be imposed that each pairwise comparison value must be based on the selections of some threshold number of users or user sessions (e.g., twenty, fifty or one hundred).

The pair mining module 43 generates or updates a suggested pairs table 47. Each entry 49 (depicted as a row) in this table 47 identifies two items that are acquired together (as part of the same transaction or session) relatively frequently by users who consider both of them. Each entry also stores an acquisition/view (A/V) data value that generally represents how frequently users who consider (e.g., view the item detail pages of) both items acquire both together. For example, the data value 0.34 may indicate that approximately 34% of the users who have viewed both items during the same session, and have purchased at least one of them, have purchased both items in combination. The pair mining module 43 may update the suggested pairs table 47 periodically (e.g., hourly, daily, or as relevant events occur) to reflect newly collected event data. As with the pairwise comparison analysis, the pair mining analysis may optionally be performed such that greater weight is given to data collected from the most recent time period or periods.

In one embodiment, an item pair that appears in one of the two tables 46, 47 typically will not appear in the other. This is because each item pair in the pairwise comparison table 46 typically represents two items that are substitutes or alternatives for one another, while each pair in the suggested pairs table 47 typically represents two items that are complementary of each other. This is the result of the data mining methods used to generate these two tables.

As discussed below, the processing performed to generate the pairwise comparison table 46 may overlap substantially with the processing performed to generate the suggested pairs table 47. Thus, although FIG. 1 depicts two separate data mining modules 42 and 43, a single module or program may be used to concurrently generate both types of data. Further, although two separate tables 46, 47 are shown in FIG. 1, a single table may be used to store both types of information.

The item association service 41 may include other modules and data structures used to mine and store data regarding other types of item relationships. For example, the service 41 may identify purchase-based item associations and item-viewing-based associations as described in U.S. Pat. No. 6,912,505. In addition, the web site system 30 shown in FIG. 1 may include numerous additional services and components for performing various other types of tasks, such as executing acquisition transactions, executing search queries, maintaining user accounts, maintaining user wish lists, shopping carts and/or rental queues, authenticating users, supporting browsing of items by category, etc.

In operation, when a user requests an item detail page via a user computing device 35, the web server 32 sends a service request to the item association service 41 requesting item association data for the corresponding item. (Each item detail page ordinarily corresponds uniquely to a particular catalog item, although one or more related items may also be described on the page as in the examples shown in FIGS. 2, 4 and 5.) If this item is paired with another item in either the pairwise comparison table 46 or the suggested pairs table 47 in one embodiment, the service 41 returns the associated table data. For example, if the request is for the detail page for item A, the service 41 would return the first two entries listed in the pairwise comparison table 46. In this example, the web server 32 would also access the catalog service 36 to retrieve catalog data for item A (the featured item), and related items B and C, such that appropriate descriptions of these items can be included in the requested page. The web server 32 may alternatively retrieve some or all of the foregoing types of service data from a cache.

Figure 3:
FIG. 3 illustrates one example of how the pairwise comparison data can be presented via an interactive item comparison page.

The pairwise comparison data and/or suggested pairs may additionally or alternatively be incorporated into other types of catalog pages, including product comparison pages of the type shown in FIG. 3, search results pages, and category pages. In addition, this data may be communicated to users and other entities via email, RSS feeds, responses to web service calls, and other communication mechanisms.

In some cases, multiple versions or variations of a particular product may be treated as the same "item" for purposes of the analyses described herein. For example, the hardcover, paperback, audio, and/or electronic versions of a particular book title may be treated as the same item. (Stated differently, the book title may be treated as the item, regardless its format.) As another example, all color and/or memory-size variations of a particular Apple iPod model may be treated as the same item. All variations or versions of a product may, but need not, be described on a common item detail page for the product.

The catalog service 36 and the item association service 41 may each be implemented as a respective computer system that executes program code. Each such computer system may include any number of physical computers or machines, and may include computers that are geographically remote from one another. The various program modules may be stored on any type or types of computer storage system or computer-readable medium. The data repositories 33, 37 and 50 shown in FIG. 1 may be implemented as databases, flat file systems, and/or other types of storage systems, and may include magnetic disks, solid-state memories, and/or other types of storage devices. More generally, each of the illustrated components 32, 33, 36, 37, 41 and 50 may be implemented in any appropriate combination of computer hardware and software.

Although the item association service 41 is illustrated as part of a particular web site system 30 in FIG. 1, it could alternatively be implemented as a separate web service that supplies content that is displayed on many different distinct web sites. In such embodiments, the servers of such web sites may send collected user activity data to the item associate service 41 for analysis, and may send web service requests to the item association service to retrieve pairwise comparison data. In such multi-site embodiments, the pairwise comparisons and/or suggested pairs may optionally be generated based on aggregated user activity data collected by a number of distinct and independently operated web sites.

III. Example Web Pages (FIGS. 2-7)

Examples of the types of catalog pages that can be generated by the system 30 will now be described with reference to FIGS. 2-7. Although the items represented on these pages are actual products, the illustrated pairwise comparison data and suggested pairing information does not necessarily reflect actual customer behavior. To simplify the drawings, some of the information and controls ordinarily included on the illustrated item detail pages (e.g., "add to cart" buttons, customer reviews, etc.) has been omitted.

FIG. 2 depicts an illustrative user interface for presenting pairwise comparison data on an item detail page. In this example, the item detail page corresponds to a particular item falling in the "HDTV" category of the catalog. The page has been supplemented with a list 60 of four additional "40-inch LCD HDTV" items that users frequently compare with the featured item. The associated pairwise comparison data values are displayed as percentage values on the item detail page. Each item in this pairwise comparison list 60 corresponds to a respective entry in the pairwise comparison table 46.

In addition to informing the user of possible alternatives to the product selected for viewing, the pairwise comparison list 60 provides valuable information, in the form of percentages, about how users choose between the featured item and each related item. Each percentage value in the illustrated embodiment is based on the choices made by users who considered both items by viewing their respective item detail pages. For example, the value 93% is based exclusively on the actions of users who, during the relevant time period, both (1) viewed the detail pages of the featured Sony Bravia KDL-40V3000 item and the related Samsung LNT4065F item, and (2) purchased one of these two items and not the other. As a result, each data value provides a highly accurate indication of which of the two items customers prefer over the other.

Each percentage value indicates, at least approximately, how frequently users who consider both items ultimately choose one of the items over the other. To increase their accuracy or utility, each data value may optionally be generated such that certain customer choices are excluded from consideration or are given less weight. For example, if the price of one of the two items has changed significantly, purchases made before the price change may be disregarded or given less weight. Changes in other item attributes, such as average customer rating or the availability of customer reviews, may be treated similarly. As another example, any purchases made while one of the two items was out-of-stock may be disregarded. Appropriate event metadata may be captured to enable the data mining processes to take these and other factors into consideration.

Although the pairwise comparison list 60 is displayed on an item detail page in this example of FIG. 2, the list 60 may alternatively be presented elsewhere, such as in a pop-up window or in a browser toolbar display area. In addition, although the pairwise comparison data values are displayed as percentage values in the examples, the raw numbers of users who selected each item may alternatively be displayed (e.g., "57 of the 75 people who selected between A and B chose B"). Information about the time period involved could also be displayed (e.g., "57 of the 75 people who selected between A and B during the last two weeks chose B"). In addition, the pairwise comparison data could alternatively be presented within a bar chart or pie chart, via color coding or shading, using icons, using different font sizes for different item descriptions, or using any other display format that enables users to assess the degree to which users prefer one item over the other.

FIG. 3 illustrates how the pairwise comparison data can be incorporated into an interactive item comparison page. A user may initiate generation of such a page by, for example, selecting a "compare these items" link on an item detail page (see FIG. 2), or by selecting specific items to compare from another type of page. In this example of FIG. 3, the page compares three items, each of which is described in a respective column. In the current view, the item described in the left hand column is selected as the "featured item" for purposes of displaying pairwise comparison data. While this item is selected, the other two columns display pairwise comparison values (in the "customers prefer" row) indicating how each respective item compares to the featured item. Specifically, the page reveals that the item represented in the middle column (model LNT-4065) is selected over the featured item (model KDL-40V3000) 92.9% of the time; and that the item in the right hand column is selected over the featured item 88.9% of the time.

While viewing the item comparison page of FIG. 3, the user can select one of the "move to front" links to cause a different item to be displayed as the featured item. Upon making such a selection, the pairwise comparison data shown in the "customers prefer" row is updated to reflect the selection. For example, if the user selects the right hand item as the featured item, the pairwise comparison values in the middle column will be updated to indicate how the item described in the middle column compares to the item described in the right hand. These updates may be made by client-side coding included in the web page document itself (e.g., by causing different portions of the page to become hidden or visible), or may be made via interactions with the web server. Although three items are depicted in this example, the illustrated feature can also be used where a greater number of items (e.g., 4, 5 or 6) are being compared.

Item comparison pages of the type shown in FIG. 3 can also be used in other environments. For example, on a travel site, an interactive comparison page could be generated that compares multiple travel destinations, and which displays pairwise comparisons of these destinations.

FIG. 4 illustrates another example of how the pairwise comparison data can be incorporated into an item detail page. In this example, the page is supplemented with a list 70 of five comparable items that are commonly viewed by those who view the featured heart rate monitor ("Polar FG Men's and Women's HRM Watch") item. This list 70 may be generated by the item association service 41 based on co-occurrences of items in session-specific item viewing histories of users, as described in U.S. Pat. No. 6,912,505, referenced above. Pairwise comparison data 80, 81 is displayed for only two of these items, as insufficient behavioral data has been collected to generate reliable comparison data for the other three. In this example, customers who chose between the Polar F11 item and the featured Polar FG item chose the Polar F11 item 58% of the time. In addition, customers who chose between the Polar RS100 item and the featured item chose the Polar RS100 item 75% of the time.

To generate a display of the type shown in FIG. 4, the web server 32 may initially send a request to the item association service 41 for a list of the items most commonly viewed in combination with the featured item. Upon obtaining this list, the web server may request pairwise comparison data for each of the resulting item pairs. The item association service 41 may alternatively support the ability for the web server 32 to retrieve both types of data (i.e., the view-based related items list 70 and the associated pairwise comparison data) via a single service request.

Figure 5:
FIG. 5 depicts an illustrative user interface for enabling a user to view pairwise comparison data that compares a featured item to a newer model.

FIG. 5 illustrates another example of how pairwise comparison data can be incorporated into an item detail page. In this example, the user interface enables a user to view pairwise comparison data 90 that compares the featured item to a newer model in the same product line. The pairwise comparison data 90 reveals that approximately 75% of the buyers who chose between the featured item and the newer model have selected the newer model. The system 30 may automatically incorporate this type of display 90 into an item detail page where, for example, the following conditions are met: (1) data obtained from the catalog service 36 or another source indicates that a newer model corresponding to the featured item is available, and (2) pairwise comparison data exists indicating that users who consider both items usually select the newer model over the featured item.

Figure 6:
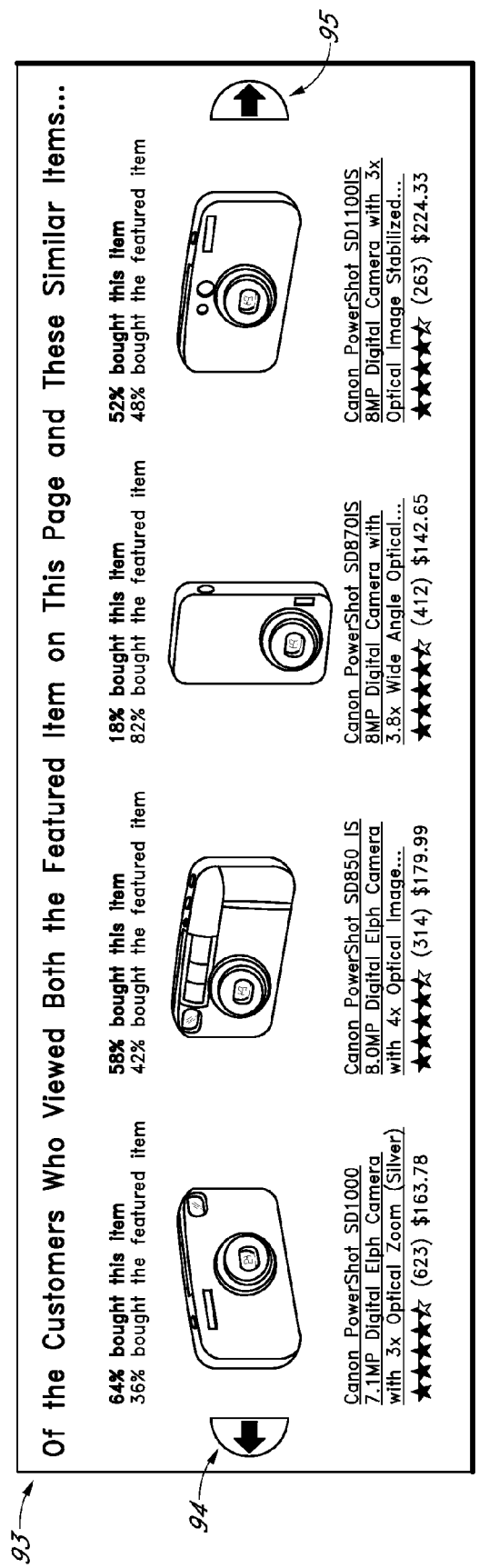
FIG. 6 illustrates another example of how the pairwise comparison data may be presented on, or in connection with, an item detail page.

FIG. 6 illustrates yet another example of a portion of a user interface 93 that may be used to incorporate pairwise comparison data into an item detail page. The portion of the item detail page describing the featured item is omitted to simplify the drawing. In this example, the user can use the left and right arrow controls 94, 95 to scroll through some or all of the related items for which pairwise comparison data is available. The web server 32 may generate this type of display 93 by initially sending a request to the item association service 41 for all pairwise comparison data for the featured item. The web server 32 may then retrieve the illustrated catalog data (photo, name, customer rating and price) for each of the comparable items from the catalog service 36.

As will be recognized, the manner in which pairwise comparison data is presented in FIGS. 2-6 is also applicable in other environments, including those listed above in Table 1.

FIG. 7 depicts an illustrative user interface for displaying suggested item pairs identified by the pair mining module (FIG. 1). In this example, the item detail page is supplemented with a section 91 that suggests purchasing the featured item in combination with an additional item. The additional item in this example is an accessory that is frequently purchased in combination with the featured item by users who compare these two items. The display 91 includes messaging 92 indicating that 34% of the customers who viewed this pair and bought at least one of the two items bought both together. This information, which may be retrieved from the suggested pairs table 47 (FIG. 1), enables users to assess the frequency with which these two items have been purchased in combination by users who have compared both. In some embodiments, the messaging 92 may alternatively indicate, e.g., that "34% of the customers who made a purchase after considering these two items purchased both together." As with the percentage values displayed for pairwise comparisons, the percentage values (if any) displayed in the messaging 92 may represent approximations.

The pairing suggestions may be presented differently than shown in FIG. 7. For example, the percentage information could be omitted, or could be replaced with the raw information from which it was derived (e.g., "18 of the 50 customers who made a purchase after viewing these two items bought both together," or "18 of 50 customers who purchased at least one of these items after considering both of them purchased both together"). Further, the pairing suggestions may be displayed on other types of pages, such as search results pages, shopping cart pages, and pages that display personalized recommendations.

IV. Process for Generating Pairwise Comparison Data (FIG. 8)

FIG. 8 illustrates one embodiment of a process 800 that may be implemented by the pairwise comparison module/system 42 (FIG. 1) to generate or update the pairwise comparison table 46. This process may be repeated periodically (e.g., once per day) to update or regenerate the pairwise comparison table 46 so that the table data reflects the most recent set of user activity data. In this embodiment, the pairwise comparison table 46 is generated based on the item viewing histories and item acquisition histories of many users (typically many millions). In one embodiment, the item acquisition histories are purchase histories.

In block 802, the collected event data descriptive of item detail page visits and item acquisitions is retrieved for all browsing sessions that occurred over a selected time period. Each session is generally a period or sequence of activity associated with a particular user identifier or user computing device. Any of a variety of known methods may be used to organize user activity data into sessions. For example, a session may begin when a user initiates browsing of a site, and may end when, e.g., the user discontinues browsing for more than a threshold period of time (e.g., ten minutes, one hour or one day), or when the user performs an acquisition or other transaction suggesting that a current task has been completed. As another example, any browsing activity performed by the user during a selected period of time, such as a twenty-four hour period, may be treated as a session regardless of the actions performed during that time period.

The relevant time period for which session data is retrieved in block 802 can vary widely. For example, session data collected over the most recent day, week or year may be retrieved for analysis. In one embodiment, the results of the analysis for the most recent time period are combined with the previously-generated results from one or more earlier time periods, optionally with successively less weight given to results from successively earlier time periods.

In block 804 of FIG. 8, the process identifies a pair of items to be compared. The two items are identified in FIG. 8 by the variables "Item A" and "Item B," which represent the unique item identifiers of the items. Any of a variety of methods may be used to select items to be compared. For example, a pairwise comparison may be performed of every two items that co-occur in at least one session-specific item viewing history; where this method is used, all of the recorded sessions may be analyzed sequentially in a single pass, as described below in the section titled "Numerical Example." As another example, a separate analysis may be performed to identify items that co-occur relatively frequently in the session-specific item viewing histories of users (as described in U.S. Pat. No. 6,912,505, referenced above); the resulting item pairs may then be selected for performing pairwise comparisons. As another example, a pairwise comparison may be performed for every possible item pairing occurring in a bottom-level item category of a hierarchical browse structure.

In block 806 of FIG. 8, the session data retrieved in block 802 is analyzed to identify all sessions in which both items (A and B) were viewed and exactly one of these items was acquired. The addition of an item to a wish list may optionally be treated as an acquisition of the item for purposes this block 806. If the identified number of sessions falls below a selected significance threshold such as twenty, thirty or fifty (block 808), the process skips to the next item pair. As mentioned above, an item may be treated as "viewed" by a user if the user accessed its detail page. While item detail pages provide a convenient mechanism for identifying items that were viewed/considered, this use of item detail pages is not essential. Ordinarily, each session identified in block 806 will correspond to a different respective user; where this is not the case, one or more sessions may optionally be discarded such that only a single session remains for each respective user.

In block 810 of FIG. 8, the percentage of users who chose A versus B is determined. For example, if eighty sessions were identified in step 806, twenty of which resulted in a purchase of Item A and sixty of which resulted in a purchase of Item B, the resulting percentages for A and B would be 25% and 75%, respectively. (Note that the two percentage values always add up to 100%.) The result of this calculation represents the pairwise comparison data for the currently selected item pair, and may be stored in a temporary table in association with the identifiers of the two items. Rather than calculating percentage values, the raw purchase counts for A and B may alternatively be stored. If additional item pairs remain to be analyzed in block 812, the process is repeated for the item pair.

In block 814 of FIG. 8, the pairwise comparison data for the analyzed item pairs may be appropriately sorted and filtered. For example, a given Item A may be compared to many different Item Bs, B1, B2, B3 . . . Bn, only a few of which users frequently choose over A. Thus, all of the pairwise comparison results for Item A may be sorted from highest to lowest percentage of selection of B over A, and all but those with the highest percentages may be discarded. As another example, any item pair whose "purchased together" percentage exceeds a selected threshold may be filtered out on the basis that the items are not likely substitutes of each other.

In block 816 of FIG. 8, the results are optionally combined with results from prior time periods, such as by taking weighted averages of corresponding pairwise comparison values. This step may alternatively be performed prior to step 810, such that the session count totals from the current period are combined with like session count totals from prior time periods for purposes of step 810. As mentioned above, results from prior time periods may be given less weight, such that the final result more heavily reflects the current preferences of users.

In block 818, the results of the process 800 are written to the pairwise comparison table 46 of a database 50 maintained by the item association service 50. The table data may, for example, be stored as B-tree to facilitate rapid look-up.

As one example of how the process of FIG. 8 may be implemented, the event data collected over the immediately preceding 24-hour period may be retrieved for analysis. Any/all user activity performed by a unique user during that period may be treated as a session. Once the sessions for a given pair (A, B) have been identified, and the number that chose A versus B has been counted, this information may be combined with like count values from one or more prior 24-hour periods for purposes of calculating the pairwise comparison data for this item pair.

Numerous variations to the process shown in FIG. 8 are possible. As one example, rather than analyzing specific item pairs sequentially, all of the recorded sessions may be analyzed sequentially in a single pass to generate the following count values for each pair of items (A, B) viewed in at least one session: (1) the number of sessions in which A and B were both viewed and at least one was purchased, (2) the number of sessions in which A and B were both viewed and in which A but not B was purchased, (3) the number of sessions in which A and B were both viewed and in which B but not A was purchased, and (4) the number of sessions in which A and B were both viewed and purchased. Once all of the recorded sessions have been analyzed, these count values may be used to calculate pairwise comparisons for each of the item pairs. As described below in the section titled "Numerical Example," these same count values may also be used to identify the item pairs that are best suited to be suggested in combination.

Another variation to the process shown in FIG. 8 is to give different amounts of weight to different users or user sessions for purposes of the pairwise calculation in step 810. For instance, the amount of weight given to a session/user may be inversely proportional to (1) the number of intervening items considered by the user between considering item A and item B; (2) the amount of time that lapsed between the user's consideration of these two items, and/or (3) the total length of the session, as measured, e.g., in elapsed time, total number of clicks, total number of items viewed, or a combination thereof. One example of how different amounts of weight can be given to different user event sequences is described in U.S. Pat. No. 7,321,892. The amount of weight given to a user's ultimate selection could also be based on one or more of the following: (1) the quantity of information that was available on the item's detail page at the time of the transaction; (2) the reputation of the user as a product reviewer (e.g., "top 100 reviewer"), as measured by the feedback supplied by others on this user's product reviews.

The process may also be modified such that event sequences that span multiple sessions are considered. For example, suppose a user considers items A and B during a given session, and adds one or both items to a shopping cart during this session without making a purchase. If the user subsequently completes a purchase (in a later session) of one of these items and not the other, this later purchase may be treated as if it occurred during the earlier session. In addition, as mentioned above, the process may be modified such that customer choices made prior to significant attribute changes (e.g., a drop in price of one of the two items) are excluded from consideration or given less weight. Further, rather than considering item acquisitions as the sole type of "selection" action, multiple different types of selection actions can be recognized. For example, item purchases, shopping cart add events, and wish list add events could all be treated selection events.

As will be apparent, the process depicted in FIG. 8 is not limited to catalog items, but can also be applied to other item types and environments, including those listed earlier in Table 1. In such other environments, block 806 may be modified such that the "viewed" action is replaced with another type of consideration action, and/or such that the "acquired" action is replaced with another type of ultimate selection action.

V. Process for Identifying Suggested Item Pairs (FIG. 9)

FIG. 9 depicts an illustrative method that may be implemented by the pair mining module 43 (FIG. 1) to identify item pairs to be suggested in combination. This process may be repeated periodically (e.g., once per day, once per week, or as new data becomes available) to update or regenerate the suggested pairs table 47 to reflect the most recent user activity. Typically, the suggested pairs table 47 will be generated based on the collected session data (item viewing histories and item acquisition histories) of many thousands or millions of unique users. The steps of this process generally parallel those of FIG. 8, although the criteria used to assess item pairs is different. As will be apparent, the processes of FIGS. 8 and 9 may be appropriately combined into a single process or program that generates both pairwise comparison data and suggested item pairs. In one embodiment, the item acquisition histories analyzed by the process of FIG. 9 are item purchase histories.

In block 902, the process retrieves the session data for the relevant time period, as in FIG. 8. In block 904, the process selects the first pair of items to be assessed as a candidate "suggested pair." Any of a variety of methods may be used to select item pairs to assess. In some embodiments, a "suggested pair" analysis is performed on every item pair for which both items were viewed in at least one session. In another embodiment, the item pairs selected to assess are those having relatively strong purchase-based associations or other acquisition-based associations (i.e., users who acquire Item A also tend to acquire Item B). Although items with strong purchase-based associations are often suitable for being suggested in combination, this is not always the case. For example, a single extremely popular item may tend to co-occur with a less-popular item in the purchase histories of many users, even though the two items have little or no actual relationship.

In block 906, the number of sessions is determined in which both items were viewed and at least one of them was acquired. If this number does not exceed a selected significance threshold, such as thirty, the process discards the current item pair as a candidate, and skips to the next item pair (block 908).

In block 910, the number of sessions in which both items were acquired is determined. In block 912, the process calculates a pair suitability score for the current item pair using the viewed-both count and the acquired-both count determined in blocks 906 and 910. The suitability score may be calculated as follows:

Score=num-sessions-acquired-both/num-sessions-viewed-both-acquired-at-least-one, where the numerator is the count value determined in block 910, and the denominator is the count value determined in block 906. To give pairs with more data (and hence more confidence) an advantage, the denominator may be changed to: SQRT(num-sessions-viewed-both-acquired-at-least-one). Because the score is based on both item viewing histories and item acquisition histories of users, it is a better indicator of whether the two items are complementary of each other or are otherwise useful in combination in comparison to scores based solely on item acquisition histories.

Once all of the candidate pairs have been analyzed (block 914), the calculated suitability scores are used to filter out poor candidates (namely those with relatively low scores), and/or to select the best candidates. For example, for a given item A, all items B1, B2, ... Bn that are candidates for being paired with item A (or at least those having scores that satisfy a minimum) may be ranked from highest to lowest score. The item with the highest suitability score for being paired with item A may then be selected to be suggested on item A's detail page for purchasing in combination with item A (see FIG. 7). Additional criteria, such as item price, item availability, and suitability for shipping as a unit, may also be taken into consideration in determining which pairs to suggest. The additional criteria may, but need not, be incorporated into the suitability score calculation.

In block 920, the selected item pairs are written to the suggested pairs table 47, optionally together with an A/V data value resulting from dividing num-sessions-acquired-both by num-sessions-viewed-both-acquired-at-least-one. The writing of a pair to the suggested pairs table 47 may automatically cause that pair to be recommended in the catalog. Alternatively, a separate component of the system may use the stored A/V values, or other stored pair suitability score values, to subsequently determine which pairs to recommend.

One desirable characteristic of the process shown in FIG. 9 is that it favors item pairs that have high conversion rates. In contrast, prior art approaches that merely use purchase histories do not take the conversion rates of the candidate pairs into consideration.

One possible variation to the process shown in FIG. 9 is to replace the count value num-sessions-viewed-both-acquired-at-least-one with a count of the number of sessions in which both items were viewed and something was acquired. With this variation, the messaging 92 provided on the detail page (see FIG. 7) may, for example, be changed to the following: "x % of the customers who made a purchase after viewing these two items bought both items together." Another variation is to replace num-sessions-viewed-both-acquired-at-least-one with the number of sessions in which both items were viewed. With this variation, the messaging 92 may, for example, state that "x % of the customers who viewed this pair bought both together." The specific message text 92 presented to the user, if any such text is presented, need not precisely correspond to the actual calculation performed.

With all of the score generation methods described above, the pair suitability score is based at least partly on both (1) a count of the number sessions in which both items were purchased, and (2) a count of a number of sessions in which both items were viewed (or otherwise considered). Thus, the pair's "conversion rate," which is the rate at which those who consider the pair purchase both items, is taken into consideration. Although sessions provide a convenient mechanism for analysis, the analysis may be performed without regard to the particular sessions in which recorded events occurred.

As with the pairwise comparison process described in FIG. 8, the results (or interim results) of the process in FIG. 9 may be combined with results from prior time periods. In addition, different sessions could be weighted differently in generating the suitability scores and/or the AN values. In some embodiments, the process of FIG. 9 may be performed solely to generate statistical data to be displayed with recommendations of particular item pairs; for example, the item pairs to be recommended may be selected by an entirely different method, and the process of FIG. 9 may be used solely to generate corresponding percentage values (see FIG. 7) for enabling customers to assess these item-pair recommendations.

As with the "pairwise comparison" process of FIG. 8, the process of FIG. 9 may be modified such that the recorded sessions are analyzed sequentially in a single pass to generate intermediate count values for each pair of items considered together in at least one session. These intermediate count values may then be used to calculate the pair suitability scores. An example of this approach is illustrated in the numerical example below.

As will be recognized, the methods depicted in FIGS. 8 and 9 may be implemented using fewer or additional steps, and the steps may be performed in a different order than is illustrated. In addition, the item association service 41 described herein is just one type of data mining system in which the disclosed data mining methods can be embodied. The disclosed methods can also be embodied in other types of computer systems, including systems that do not support service calls.

VI. Numerical Example

The following example illustrates how the recorded item viewing and purchasing histories of users can be processed on a session-by-session basis to generate a set of count values. These count values can then be used to generate pairwise comparison percentages and pair suitability scores. In this example, the following three user-specific event sequences or sessions are analyzed:

| User | Item | Action |
|---|---|---|
| 1 | A | view |
| 1 | B | view |
| 1 | C | view |
| 1 | B | purchase |
| 1 | C | purchase |
| 2 | A | view |
| 2 | B | view |
| 2 | C | view |
| 2 | A | purchase |
| 2 | C | purchase |
| 3 | A | view |
| 3 | B | view |
| 3 | C | view |
| 3 | B | purchase |
| 3 | C | purchase |

In practice, the number of sessions would be much larger. The goal of the process is to generate a Pairwise Counts table that contains the following count values for each pair of items (X, Y) viewed in at least one session:

Views
BoughOnlyX (by users who viewed both)
BoughtOnlyY (by users who viewed both)
BoughtBoth One way to populate this table is to run through all sessions sequentially while updating the table. After processing user 1, the Pairwise Counts table is as follows:

| Pair | Views | BoughtOnlyX | BoughtOnlyY | BoughtBoth |
|---|---|---|---|---|
| A B | 1 | 0 | 1 | 0 |
| A C | 1 | 0 | 1 | 0 |
| B C | 1 | 0 | 0 | 1 |

After processing user 2, the Pairwise Counts table is as follows:

| Pair | Views | BoughtOnlyX | BoughtOnlyY | BoughtBoth |
|---|---|---|---|---|
| A B | 2 | 1 | 1 | 0 |
| A C | 2 | 0 | 1 | 1 |
| B C | 2 | 0 | 1 | 1 |

After processing user 3, the Pairwise Counts table is as follows:

| Pair | Views | BoughtOnlyX | BoughtOnlyY | BoughtBoth |
|---|---|---|---|---|
| A B | 3 | 1 | 2 | 0 |
| A C | 3 | 0 | 2 | 1 |
| B C | 3 | 0 | 1 | 2 |

The count of "users who viewed both and bought at least one of them" can be calculated by summing the last three columns.

Another way of arriving at this final table is to output the pair stats for each user, and then to sort them, and then to sum across rows with repeated Pairs. With this approach, the pair stats for users 1, 2 and 3 are as follows:

| | | | | |
|---|---|---|---|---|
| | User 1: | | | |
| A B | 1 | 0 | 1 | 0 |
| A C | 1 | 0 | 1 | 0 |
| B C | 1 | 0 | 0 | 1 |
| | User 2: | | | |
| A B | 1 | 1 | 0 | 0 |
| A C | 1 | 0 | 0 | 1 |
| B C | 1 | 0 | 1 | 0 |
| | User 3: | | | |
| A B | 1 | 0 | 1 | 0 |
| A C | 1 | 0 | 1 | 0 |
| B C | 1 | 0 | 0 | 1 |

Sorting the above 9 rows by the pair gives:

| | | | | |
|---|---|---|---|---|
| A B | 1 | 0 | 1 | 0 |
| A B | 1 | 0 | 1 | 0 |
| A B | 1 | 1 | 0 | 0 |
| A C | 1 | 0 | 1 | 0 |
| A C | 1 | 0 | 0 | 1 |
| A C | 1 | 0 | 1 | 0 |
| B C | 1 | 0 | 0 | 1 |
| B C | 1 | 0 | 1 | 0 |
| B C | 1 | 0 | 0 | 1 |

Summing across the rows where the Pair is the same gives:

| | | | | |
|---|---|---|---|---|
| A B | 3 | 1 | 2 | 0 |
| A C | 3 | 0 | 2 | 1 |
| B C | 3 | 0 | 1 | 2 |

This agrees with the earlier version of the final Pairwise Counts table generated above.

The final Pairwise Counts table reveals the following information about each pair, disregarding the statistically insignificant quantity of data used for illustrative purposes:

Pair=A, B: 0% of the 3 users who viewed (A, B) and bought A or B, bought both of them. This indicates they are likely substitutes. Of those 3 users, ⅔ prefer B over A. As likely substitutes, this pair is well suited for the display of pairwise comparison data to assist users in selecting between the two.

Pair=A, C: 33% of the 3 users who viewed (A, C) and bought A or C, bought both of them. This indicates they are complements, and may be suitable for being recommended in combination.

Pair=B, C: 67% of the 3 users who viewed (B, C) and bought B or C, bought both of them. This is an even stronger indication that these two are complements. This data may be used as a basis to (1) augment item B's detail page with a recommendation to purchase B in combination with item C, and/or (2) augment item C's detail page with a recommendation to purchase C in combination with item B. FIG. 7, discussed above, illustrates one example of how item detail pages can be augmented with such recommendations.

VII. Conclusion

As will be apparent, the features and attributes of the specific embodiments disclosed above may be combined in different ways to form additional embodiments, all of which fall within the scope of the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system, comprising:
   at least one data storage system that stores user activity data reflective of catalog item viewing events and catalog item acquisition events of each of a plurality of users of an electronic catalog;
   a data mining system operative to analyze the user activity data reflective of the catalog item viewing events and catalog item acquisition events, and based thereon, to generate pairwise comparison data for each of a plurality of pairs of catalog items, said pairwise comparison data at least approximately indicating, for an item pair composed of a first catalog item and a second catalog item, how frequently users who view both the first catalog item and the second catalog item select the second catalog item to acquire over the first catalog item; and
   a server system operative to incorporate the pairwise comparison data into catalog pages of the electronic catalog in association with catalog items to which such pairwise comparison data corresponds, the server system thereby enabling users to consider the pairwise comparison data in selecting catalog items to acquire.

2. The system of claim 1, wherein the data mining system is operative to generate the pairwise comparison data for said item pair at least partly by:
   identifying a plurality of sessions in which both (1) the first catalog item and the second catalog item were both viewed, and (2) exactly one of the first and second catalog items was selected to acquire; and
   determining how many of said plurality of sessions are sessions in which the second catalog item was selected to acquire.

3. The system of claim 2, wherein the data mining system is further operative to generate a percentage value reflective of how frequently the second catalog item was selected over the first catalog item in the plurality of sessions, and the server system is operative to incorporate said percentage value into an item detail page corresponding to the first catalog item.

4. The system of claim 2, wherein the data mining system is operative to give different non-zero amounts of weight to different ones of said sessions in generating the pairwise comparison data.

5. The system of claim 1, wherein the data mining system is operative to generate the pairwise comparison data for said item pair at least partly by:
   identifying a set of users who both (1) viewed both the first catalog item and the second catalog, and (2) acquired exactly one of the first and second catalog items; and
   determining how many of the users in said set acquired the second catalog item.

6. The system of claim 5, wherein the server system is operative to supplement an item detail page for the first item with an indication of what percentage of the users in said set acquired the second catalog item.

7. The system of claim 1, wherein the catalog item viewing events are item detail page viewing events.

8. The system of claim 1, wherein the catalog item acquisition events are item purchase events.

9. The system of claim 1, wherein the server system is operative to generate an item comparison page that includes pairwise comparison data for each of multiple pairs of catalog items.

10. The system of claim 9, wherein the item comparison page is an interactive page in which each of three or more catalog items is selectable to cause pairwise comparison data to be displayed which compares the selected catalog item on a pairwise basis to each of the other catalog items.

11. A system, comprising:
   at least one data storage system that stores user activity data reflective of item consideration actions and item selection actions of each of a plurality of users, said item consideration actions and item selection actions corresponding to particular items represented in a browsable electronic data repository; and
   a data mining system operative to analyze the user activity data reflective of the item consideration actions and the item selection actions of the plurality of users on an aggregated basis to generate pairwise comparison data for each of a plurality of item pairs, said pairwise comparison data at least approximately indicating, for an item pair composed of a first item and a second item, a degree to which users who consider both the first item and the second item select the second item over the first item, said data mining system further operative to store said pairwise comparison data in computer storage in association with the item pairs to which such pairwise comparison data corresponds.

12. The system of claim 11, further comprising a server system operative to expose the pairwise comparison data to users of the browsable electronic data repository in association with the items to which such pairwise comparison data corresponds.

13. The system of claim 11, wherein the data mining system is operative to generate the pairwise comparison data for said item pair at least partly by:
    identifying a set of sessions in which both (1) the first item and the second item were both considered, and (2) exactly one of the first item and the second item was selected; and
    determining how many of the sessions in said set are sessions in which the second item was selected.

14. The system of claim 11, wherein the data mining system is operative to generate the pairwise comparison data for said item pair at least partly by:
    identifying a set of users that both (1) considered both the first item and the second item, and (2) selected the second item and not the first item; and
    determining how many of the users in the set selected the second item.

15. The system of claim 11, wherein the items are catalog items represented in an electronic catalog.

16. The system of claim 15, wherein the item selection actions are catalog-item purchase actions.

17. The system of claim 11, wherein the items are users represented in a social networking system.

18. The system of claim 11, wherein the items are feeds to which users can subscribe, and the item selection actions are feed subscription actions.

19. A computer-implemented method of performing a pairwise comparison between a first item and a second item represented in an electronic data repository, the method comprising:
    accessing session data stored in computer storage, said session data reflective of item consideration actions and item selection actions of each of a plurality of users, said item consideration actions and item selection actions corresponding to particular items represented in the electronic data repository;
    based on the session data, identifying a set of sessions in which both (1) the first item and the second item were both considered, and (2) exactly one of the first item and the second item was selected, said set of sessions comprising a plurality of sessions of a plurality of users;
    generating, by a computer system, pairwise comparison data based on the identified set of sessions, said pairwise comparison data indicating, at least approximately, a degree to which users who have considered both the first item and the second item have selected the second item over the first item; and
    causing the pairwise comparison data to be presented to users of the electronic data repository in association with the first and second items.

20. The method of claim 19, wherein the electronic data repository is an electronic catalog, and the method comprises causing the pairwise comparison data to be presented on an item detail page of the electronic catalog.

21. The method of claim 19, wherein the items are travel destinations represented on a travel site, and the method comprises causing the pairwise comparison data to be presented on the travel site to assist users in selecting a travel destination.

22. The method of claim 19, wherein the pairwise comparison data indicates what percentage of users who considered both the first item and the second item selected the second item.

23. The method of claim 19, wherein generating the pairwise comparison data comprises giving different non-zero amounts of weight to different sessions in said set of sessions.

24. A computer-readable medium which stores executable instructions that embody the method of claim 19.

25. A computer system, including one or more physical computers coupled to computer storage, said one or more physical computers being programmed to perform the method of:
    accessing session data stored in computer storage, said session data reflective of item consideration actions and item selection actions of each of a plurality of users, said item consideration actions and item selection actions corresponding to particular items represented in the electronic data repository;
    based on the session data, identifying a set of sessions in which both (1) the first item and the second item were both considered, and (2) exactly one of the first item and the second item was selected, said set of sessions comprising a plurality of sessions of a plurality of users;
    generating pairwise comparison data based on the identified set of sessions, said pairwise comparison data indicating, at least approximately, a degree to which users who have considered both the first item and the second item have selected the second item over the first item; and
    causing the pairwise comparison data to be presented to users of the electronic data repository in association with the first and second items.

* * * * *